(12) United States Patent
Monroe

(10) Patent No.: US 9,465,374 B2
(45) Date of Patent: Oct. 11, 2016

(54) COMPUTER SYSTEM PERFORMANCE MANAGEMENT WITH CONTROL VARIABLES, PERFORMANCE METRICS AND/OR DESIRABILITY FUNCTIONS

(71) Applicant: Intel Corporation, Santa Clara, CA (US)

(72) Inventor: Eric M. Monroe, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 867 days.

(21) Appl. No.: 13/673,844

(22) Filed: Nov. 9, 2012

(65) Prior Publication Data

US 2013/0123950 A1    May 16, 2013

(30) Foreign Application Priority Data

Nov. 10, 2011  (WO) .................. PCT/US2011/60152

(51) Int. Cl.
G05B 13/02     (2006.01)
G05B 15/02     (2006.01)
G05B 13/04     (2006.01)

(52) U.S. Cl.
CPC ............. *G05B 15/02* (2013.01); *G05B 13/041* (2013.01)

(58) Field of Classification Search
CPC .............................. G05B 13/041; G05B 15/02
USPC ......................................................... 700/52
See application file for complete search history.

(56) References Cited

U.S. PATENT DOCUMENTS

| | | |
|---|---|---|
| 5,623,598 A | 4/1997 | Voigt et al. |
| 6,609,083 B2 | 8/2003 | Enck et al. |
| 6,795,790 B1 * | 9/2004 | Lang ................... H04L 12/2697 702/123 |
| 7,290,048 B1 | 10/2007 | Barnett et al. |
| 2003/0216890 A1 | 11/2003 | Gross et al. |

(Continued)

FOREIGN PATENT DOCUMENTS

CN          1460966 A          12/2003

OTHER PUBLICATIONS

International Search Report and Written Opinion mailed Jul. 30, 2012 for PCT Application No. PCT/US2011/060152, 9 pages.

(Continued)

*Primary Examiner* — Mohammad Ali
*Assistant Examiner* — Yuhui R Pan
(74) *Attorney, Agent, or Firm* — Schwabe, Williamson & Wyatt, P.C.

(57) ABSTRACT

Embodiments of techniques and systems for managing performance of a computing system are described. In embodiments, parameters may be received describing control variables for a computing system, workloads that are performed on the computing system, and performance metrics for the computing system. An experimental plan may be generated for modifying the control variables during execution of the computing system and observing performance metrics during this execution. The recorded observations may then be used in to determine one or more relationships between the control variables and the performance metrics. Relationships between the control variables and a desirability function associated with performance of the computer system may also be determined. These relationships may be displayed in visualizations to a user, and may be used to by the user to select values for the computing system which increase the desirability function. Other embodiments may be described and claimed.

20 Claims, 10 Drawing Sheets

(56) References Cited

U.S. PATENT DOCUMENTS

| | | |
|---|---|---|
| 2006/0090163 A1 | 4/2006 | Karisson et al. |
| 2007/0271368 A1 | 11/2007 | Liu et al. |
| 2008/0319731 A1* | 12/2008 | Chambliss ............ H04L 41/024 703/22 |
| 2009/0089670 A1 | 4/2009 | Gooding et al. |
| 2009/0327689 A1 | 12/2009 | Lazar |

OTHER PUBLICATIONS

International Preliminary Report on Patentability mailed May 22, 2014 for International Application No. PCT/US2011/060152, 6 pages.

Extended European Search Report mailed Jul. 30, 2015 for European Application No. 11875477.9, 8 pages.

* cited by examiner

COMPUTER SYSTEM PERFORMANCE MANAGEMENT WITH CONTROL VARIABLES, PERFORMANCE METRICS AND/OR DESIRABILITY FUNCTIONS

RELATED APPLICATIONS

The present application claims priority under 35 U.S.C. §§119 and 365(a) to International Application No. PCT/US2011/60152, filed Nov. 10, 2011, entitled "COMPUTER SYSTEM PERFORMANCE MANAGEMENT WITH CONTROL VARIABLES, PERFORMANCE METRICS AND/OR DESIRABILITY FUNCTIONS", which designated the United States of America and at least one country other than the United States. The entire contents and disclosure of International Application No. PCT/US2011/60152 is hereby incorporated by reference in its entirety.

TECHNICAL FIELD

This application relates to the technical field of data processing, and more specifically to determination of control variable relationships for computer systems.

BACKGROUND

Administrators of computer systems often make decisions about selecting control settings for computer systems. For example, a server environment may share common system resources (CPU, memory, disk space) between many computing applications, each with differing priority levels. The demands of the applications may change over time of day (e.g., backups) or day of the month (e.g., end-of-month financial data runs). Oftentimes an administrator of the server may wish to select different values for control variables that control the system for different periods of time. Examples of such control variables may include priorities for the various applications, caching policies, memory and/or storage allotment, etc. to allow for efficient execution of the various workload runs on the server over the different periods of time. However, it may be difficult for an administrator to select values for the many different control variables. It may be especially difficult for the administrator to know if a particular selection of values for the control variables is collectively superior to other selections in providing improved performance. This is particularly true when the system utilizes many control variables, creating a problem space having a high dimensionality.

In various existing systems, an administrator may attempt to determine one or more values by running test processes, looking at results, changing a control variable value, and running the test processes again. While this may, in some scenarios, aid an administrator in selecting some control variable values, there administrator may not have great confidence that there are not other values that would provide even better performance results.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Figure 1:
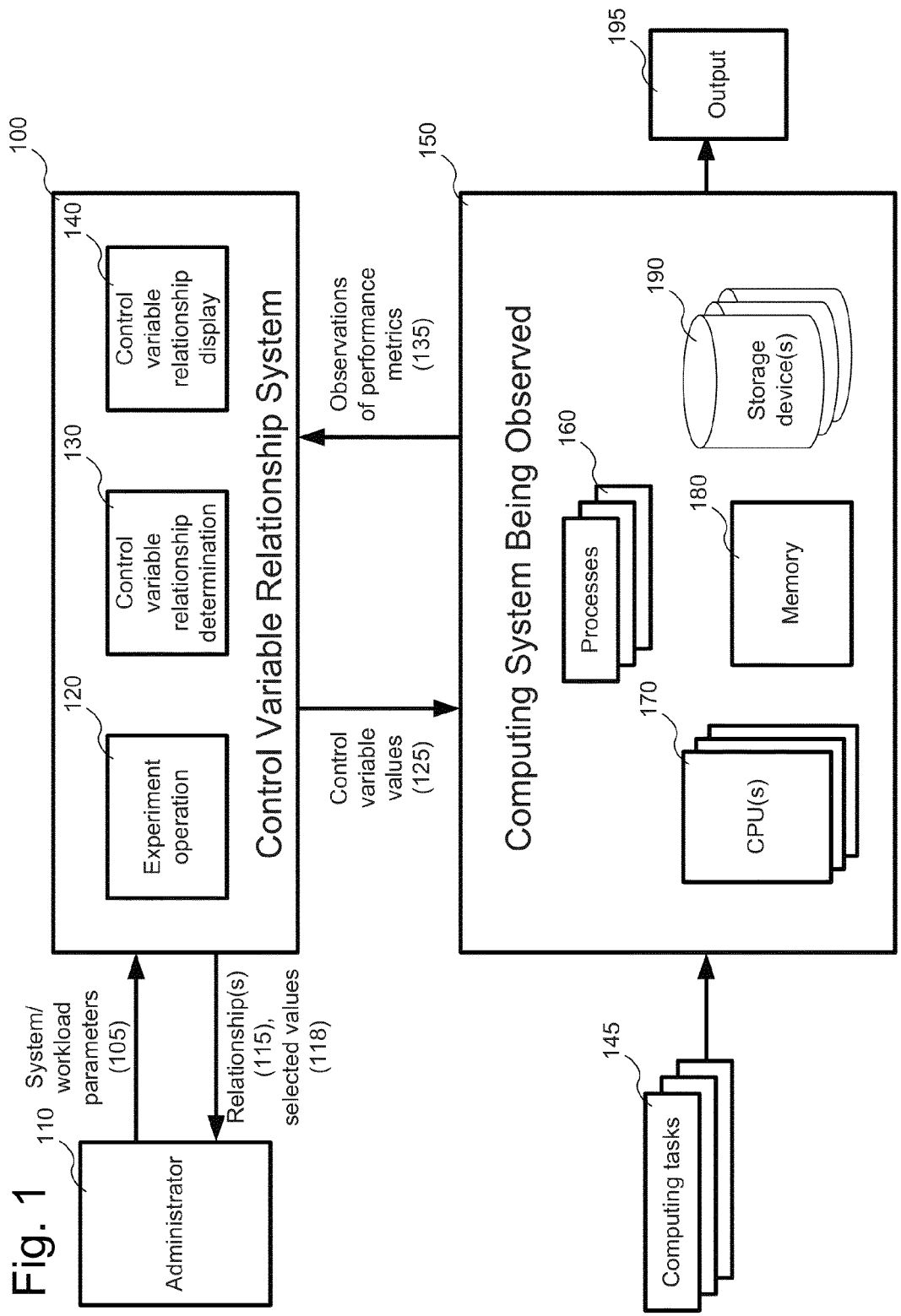
FIG. 1 is block diagram illustrating an example control variable relationship system, in accordance with embodiments of the present disclosure.

Methods, apparatuses, and storage media associated with determination of control variable relationships during execution of computer systems are disclosed herein.

In various embodiments, one or more computer-readable storage media may include instructions that, in response to execution by a computing device, cause the computing device, for managing performance of a computer system, to, during execution of one or more processes on the computing system controlled by a set of control variables, record observations of one or more performance metrics for the computing system executing the one or more processes. The computing device may also modify values of the one or more control variables. The computing device may also repeat the recording and modifying for multiple modifications of the values of the control variables. The computing device may also determine one or more relationships between the control variables and a desirability metric associated with performance of the computer system, based at least in part on the recorded observations of the one or more performance metrics.

In various embodiments, an apparatus may include one or more computer processors. The apparatus may also include an experimental operation module configured to operate on the one or more computer processors, for managing performance of a computer system. The experimental operation module may record observations of one or more performance metrics for the computing system executing one or more processes. The experimental operation module may also modify values of one or more control variables for the computer system executing one or more processes. The experimental operation module may also repeat the recording and modifying for multiple modifications of the values of the control variables. The apparatus may also include a control variable relationship module configured to operate on the one or more processors to determine one or more relationships between the control variables and a desirability metric associated with performance of the computer system, based at least in part on the recorded observations of the one or more performance metrics. The apparatus may also include a relationship display module configured to operate on the one or more processors to display one or more visualizations of the one or more relationships between the control variables and the desirability metric.

In various embodiments, one or more computer-readable storage media may include instructions that, in response to execution by a computing device, cause the computing device, for managing performance a computer system, to receive one or more parameters describing the computer system executing one or more processes, the computer system controlled by a set of control variables. The computing device may also generate an experimental plan directing modification of values of one or more of the control variables during execution of the one or more processes. The computing device may also record observations of one or more performance metrics for the computing system executing the one or more processes during modification of one or more of the control variables according to the experimental plan. The computing device may also, based on the recorded observations of the control variables, determine one or more relationships between the control variables and a desirability metric associated with performance of the computer system.

In various embodiments, an apparatus may include one or more computer processors. The apparatus may also include an experimental operation module configured to operate on the one or more computer processors for performance management of a computer system. The experimental operations module may receive one or more parameters describing the computer system executing one or more processes, the computer system being controlled by a set of control variables. The experimental operations module may also generate an experimental plan directing modification of values of one or more of the control variables during execution of the one or more processes. The experimental operations module may also record observations of one or more performance metrics for the computing system executing the one or more processes white modify one or more of the control variables according to the experimental plan. The apparatus may also include a control variable relationship module configured to operate on the one or more processors. The control variable relationship module may, based on the recorded observations of the control variables, determine one or more relationships between the control variables and a desirability metric associated with performance of the computer system.

In various embodiments, computer-implemented methods may include one or more operations described herein.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Various operations will be, described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)".

Referring to FIG. 1, a block diagram is shown illustrating a control variable relationship system 100, which is configured to interact with a computing system 150 to observe values of performance metrics 135 associated with execution of one or more computing tasks 145 on the computing system 150 and to indicate, such as to an administrator 110, one or more relationships 115 relating to control variables used to control the computing system 150. In various embodiments, the control variable relationship system 100 may be configured to receive one or more system and/or workload parameters 105 from the administrator 110, such as described herein. The control variable relationship system 100 may be further configured to then generate an experimental plan and direct the computing system 150 to use one or more control variable values 125 directed by the generated plan. The control variable relationship system 100 may also be configured to observe values of performance metrics 135 from the computing system 150 and record observations of these performance metrics values 135, such as described herein.

In various embodiments, the control variable relationship system 100 may be configured to interact with the computer system 150 as it is operating, such as in a production environment. In various embodiments, the computing system 150 may comprise shared resources, such as, for example, one or more CPU(s) 170, shared memory 180, and/or one or more storage device(s) 190. In various embodiments, these resources may be shared amongst one or more processes 160. In various embodiments, the processes 160 may be configured to perform one or more computing tasks 145; in some embodiments, these computing tasks may be referred to as the workload performed by the computing system 150. In various embodiments, the computing tasks may be similar or identical to the computing tasks performed by the computing system 150 during its normal operation. Thus, in such embodiments, the control variable relationship system 100 may be configured to perform experimentation and observation during production operation of the computing system. In other embodiments, the computing tasks may be defined, in whole or in part, by the administrator 110.

In various embodiments, the sharing of the shared resources of the computing system 150 may be controlled by one or more control variables for the computing system. For example, one or more control variables may control priorities of operation of the processes 160 on the one or more CPU(s) 170. In another example, one or more control variables may determine, for a given one of die processes 160, how much memory that application may use out of the shared memory 180; similarly, control variables may control usage of the shared storage device(s) 190. In various embodiments, other resources other than those illustrated may be shared by computing devices with which the control variable relationship system 100 interacts. In various embodiments, control variables other than those described herein may control operation of the processes 160. In various embodiments, the execution of the one or more processes 160 may result in output 195 of the various processes 160. In various embodiments, the control variable relationship system 100 may be configured to also record observations of values of performance metrics 135 for the computing system 150. In various embodiments, these observations of values of performance metrics 135 may include, for example, observations of process performance times, CPU utilization, memory utilization, storage device utilization, storage and/or memory accesses, cache page faults, and/or other metrics indicating performance of the computing system 100.

In various embodiments, the control variable relationship system 100 may be configured to, based on observations of performance metrics 135, determine one or more relationships relating to the control variables and report these relationships to the administrator 110. In one example, the control variable relationship system 100 may be configured to determine one or more relationships between control variables and one or more performance metrics for the computing system 150. In another example, the control variable relationship system 100 may be configured to determine one or more relationships between control variables and a desirability metric, to be described more fully below. In various embodiments, the control variable relationship system 100 may select one or more values for the control variables for which relationships have been determined. In various embodiments, these selected values 118 may also be reported to the administrator 110.

In various embodiments, the control variable relationship system 100 may include one or more modules which may operate on one or more processors to facilitate operations described herein. For example, in various embodiments, the control variable relationship system 100 may, in various embodiments, include an experiment operation module 120 which may receive system/workload parameters 105 from the administrator. In various embodiments, the experiment operation module 120 may be configured to also generate an experimental plan directing control variable values 125 to be used by the computing system 150 during execution of the computing tasks 145. Examples of operations of the experiment operation module 120 are described below.

The control variable relationship system 100 may be configured to, in various embodiments, include a control variable relationship determination module 130 which may be configured to record the observations of performance metrics 135 of the computing system 150. In various embodiments, the control variable relationship determination module 130 may be configured to also determine one or more of the relationships 115 relating to the control variables. Examples of operations of the control variable relationship determination module 130 are described below.

The control variable relationship stem 100 may be configured to, in various embodiments, include a control variable relationship display module 140 which may be configured to generate one or more visualizations of the control variable relationships 115 determined by the control variable relationship determination module 130. In various embodiments, the control variable relationship display module 140 may be configured to output these visualizations for display to the administrator 110. In some embodiments, the control variable relationship display module 140 may be configured to transmit one or more visualizations to a separate display, including, but not limited to, a monitor, laptop screen, tablet device, smartphone, or other wired or wireless device with a display. Examples of operations of the control variable relationship display module 140 are described below.

Figure 2:
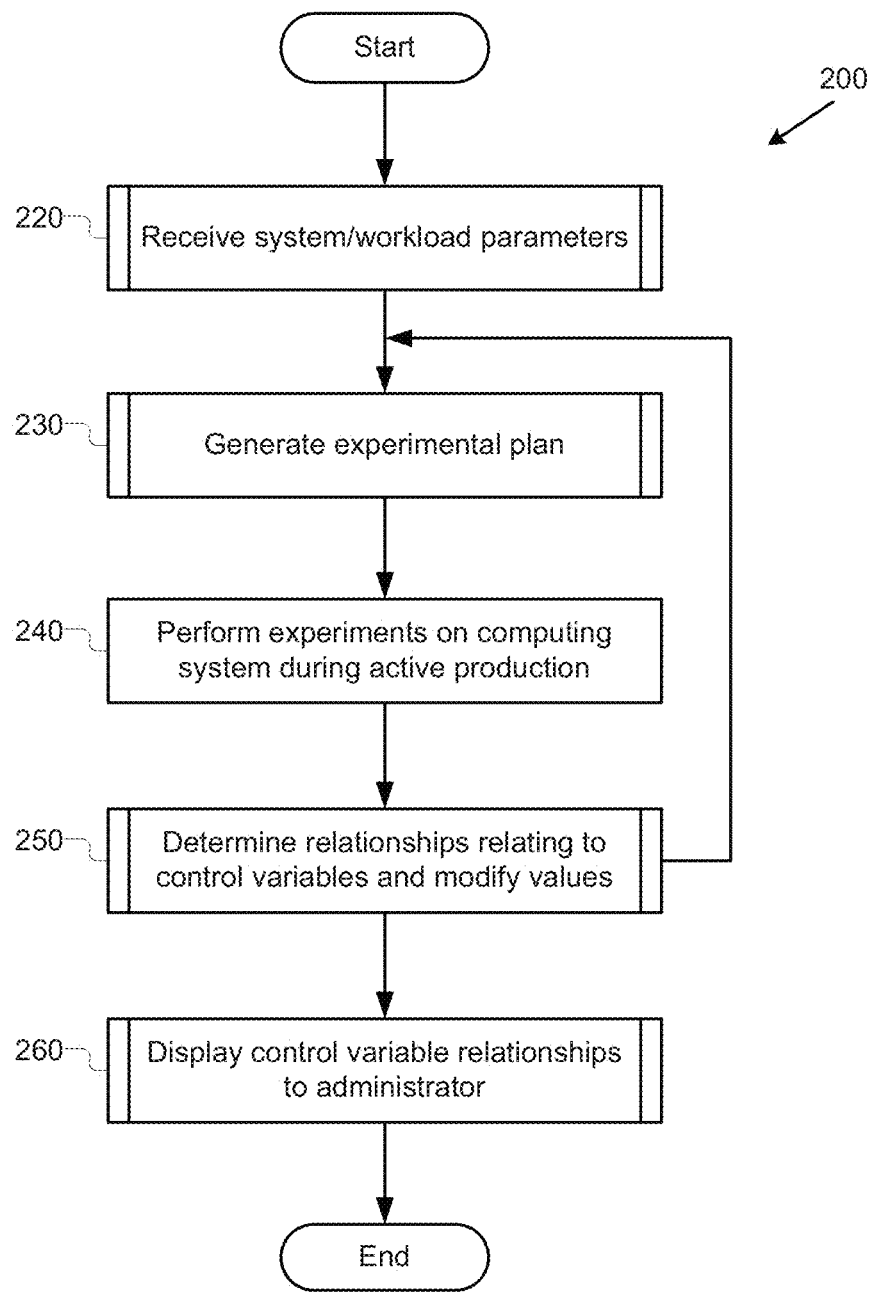
FIG. 2 illustrates an example control variable relationship determination process, in accordance with various embodiments.

FIG. 2 illustrates an example control variable relationship determination process 200, in accordance with various embodiments. In various embodiments process 200 may be performed by the control variable relationship system 100. The process may begin at operation 220, where the control variable relationship system 100 may receive system/workload parameters 105 from the administrator 110. Particular implementations of operation 220 may be described below. Next, at operation 230, the control variable relationship system 100 may generate an experimental plan to use in recording the observations of the performance metrics 135. In various embodiments, the experimental plan may direct values to be used in the control variables controlling the computing system 150 during production. In various embodiments, the experimental plan may also specify one or more of the control variables and/or noise factors that are observed by the control variable relationship system 100 during execution of the computing system 150. Particular implementations of operation 230 may be described below.

Next, at operation 240, the control variable relationship system 100 may perform experiments on the computing system 150. In various embodiments, operation 240 may be performed by the experiment operation module 120. In various embodiments, the experiments may be performed by repeatedly modifying values of one or more control variables and recording observations of one or more performance metrics during execution of the computing system 150.

In various embodiments, the experiments, and in particular modification to the values of the control variables, may be performed in accordance, or under the direction of, the experimental plan generated at operation 230. In various embodiments, experiments may be performed at operation 240 for pre-determined periods of time, and may be changed one or more times, such as in accordance with or at the direction of the generated experimental plan. In various embodiments, as mentioned above, these experiments may be performed during active production on the computing system 150. In such embodiments, the experiments may be performed on the computing system 150 during production in order to receive observations of performance metrics 135 that are relevant and similar to those seen during other actual production times.

Next, at operation 250, the control variable relationship system 100 may determine relationships relating to one or more of the control variables that were affected as part of the experiment performed at operation 240. Additionally, in various embodiments, values for the control variables may be modified for the computing system during this operation. In various embodiments, after completion of operation 250, the control variable relationship system 100 may repeat one or more of operations 230-250 again. In various embodiments, this repetition may allow for repeated fine-tuning of the computing system based on experimental outcomes, white still allowing for increased efficiencies as values are determined and set at each iteration. Particular implementations of operation 250 may be described below. In various embodiments, the control variable relationship system 100 may also proceed from operation 250 to operation 260 where the control variable relationship system 100 may display one or more of the relationships determined at operation 250. Particular implementations of operation 260 may be described below. Process 200 may then end.

Figure 3:
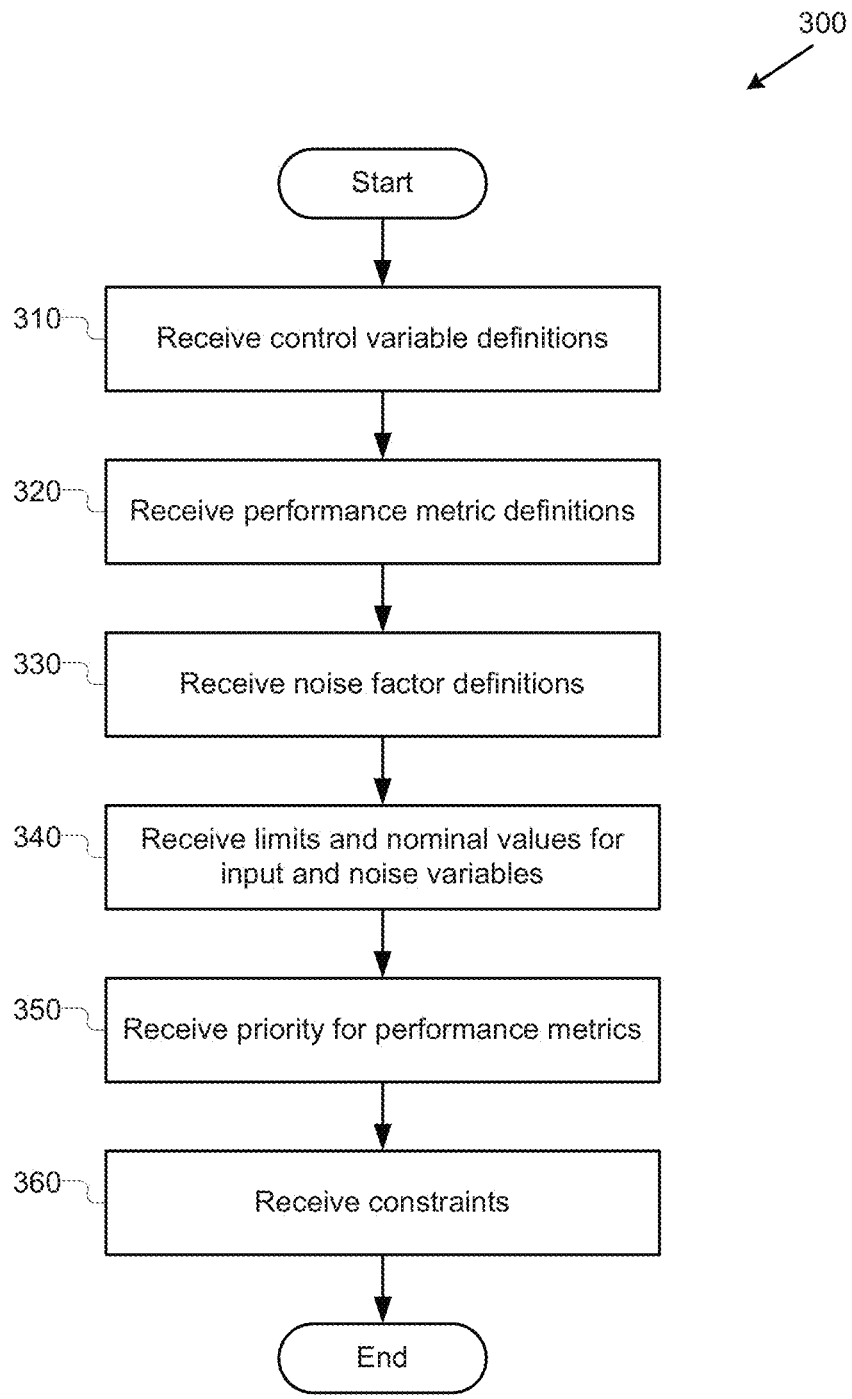
FIG. 3 illustrates an example system/workload parameter receipt process, in accordance with various embodiments.

FIG. 3 illustrates an example system/workload parameter receipt process 300, in accordance with various embodiments. In various embodiments, process 300 may describe one or more implementations of operation 220 of process 200. In various embodiments, the operations of process 300 may be performed by the experiment operation module 120 of the control variable relationship system 100. In various embodiments, the various definitions and values received by the experiment operation module 120 may be received from the administrator 110. The process may begin at operation 310, where the experiment operation module 120 may receive control variable definitions in various embodiments, control variables may include factors that control performance and/or operation of the computing system 150. In various embodiments, these control variables may be selected for definition by the administrator 110 as those variables for which he or she wants to receive relationship information.

Next, at operation 320, the experiment operation module 120 may receive performance metric definitions. In various embodiments, the performance metric definitions may also be received from the administrator 110. In various embodiments, the performance metrics may also be selected for definition by the administrator 110 as those metrics for which he or she wants to receive relationship information. In other embodiments, the performance metrics may be selected due to their importance to computing and/or business outcomes. In various embodiments, the performance metrics may be selected due to the administrator wishing to positively influence them during production.

In various embodiments, at operation 320 the experiment operation module 120 may also receive desirability function parameters for the performance metrics. Thus, in various embodiments, the administrator 110 may be able to provide quantitative and/or qualitative parameters for one or more of the performance metrics. In various embodiments, these parameters may include a desirability value, such s a value between 0 and 1 (which may map to between 0% and 100%) of how desirable a particular performance metric is. In other embodiments, the administrator 110 may provide further information about desired values for the performance metrics. Thus, in one example, the experiment operation module 120 may receive an indication that higher values are better for a particular performance metric. In another example, the experiment operation module 120 may receive an indication that lower values are better for a particular performance metric. In yet another example, the experiment operation module 120 may receive an indication that values are better for a particular performance metric when they are closest to a particular nominal value and/or when they fall within a particular range.

Next, at operation 330, the experiment operation module 120 may receive noise factor definitions. In various embodiments, these noise factors may include factors which are not controllable by the administrator. In various embodiments, these noise factors may include factors for which the administrator 110 desires to monitor and to quantify their impact on the defined performance metrics. In various embodiments, monitoring of the noise factors may serve to quantify robustness of the experimental plan and/or the determined control variable relationships.

Next, at operation 340, the experiment operation module 120 may receive limits such as, for example, maximum and/or minimum values) and nominal values for the control variables and/or the noise factors. In various embodiments, these values will serve to provide limits for experimentation, as well as nominal values for the control variables and noise factors when other variables and/or factors are being modified.

Next, at operation 350, the experiment operation module 120 may receive priority for the one or more performance metrics. In various embodiments, some performance metrics may be more important to the administrator than others. For example, in an enterprise data warehouse environment, tasks may be defined at different levels, such as, for example, "mission critical," "business important," and "ad-hoc user requests." In various embodiments, by receiving these priorities, the control variable relationship system 100 may be able to weigh more important output criteria more heavily when determining relationships associated with the control variables. In some embodiments, priorities may be quantified. For example priorities may be quantified on a 3:2:1 scale. In other embodiments, other priority value combinations may be used.

Next, at operation 360, the experimental operation module 120 may receive constraints on modifications performed during experimentation. It may be noted that in some experimental plans, it maybe desirable to modify values for each control variable value randomly. However, there are often cases where this may not be possible or desirable. For example, certain control variables may be difficult to change (such as, for example, due to machine set-up times, server downtimes needed to make a modification, etc.). In other scenarios, performance metrics may be not be able to be observed very frequently (such as, for example, a metric based on completed jobs when the jobs take a substantial amount of time to perform). Thus, in some embodiments, at operation 360, the experimental operation module 120 may receive one or more designations of a qualitative level of difficulty (e.g., "easy," "hard," "very hard") for modification of each of the control variables. Also, in some embodiments, at operation 360 the experimental operation module may receive one or more designations of frequencies for how often the performance metrics are to be observed and/or recorded. After the completion of operation 360, process 300 may end.

Figure 4:
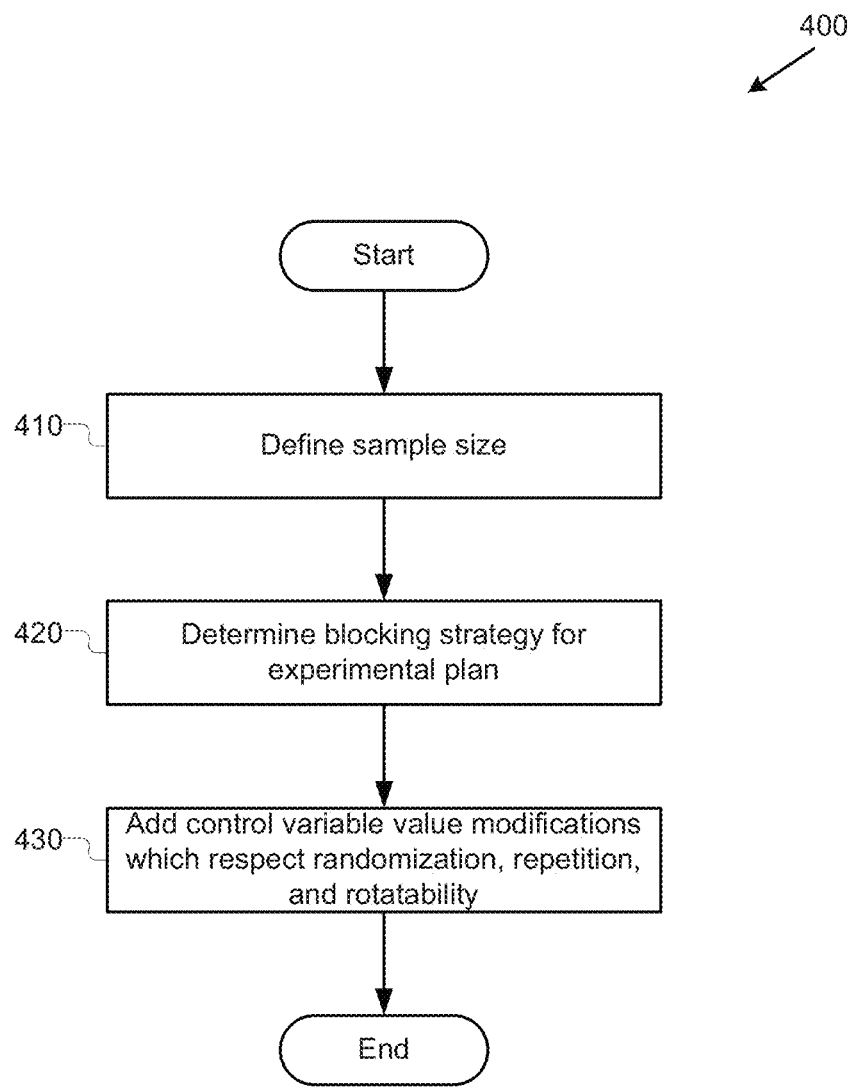
FIG. 4 illustrates an example experimental plan generation process, in accordance with various embodiments.

FIG. 4 illustrates an example experimental plan generation process 400, in accordance with various embodiments. In various embodiments, process 400 may describe one or more implementations of operation 230 of process 200. In various embodiments, the operations of process 400 may be performed by the experiment operation module 120 of the control variable relationship system 100. The process may begin at operation 410, where the experimental operation module 120 may define a sample size for the experimental plan. In various embodiments, the sample size may be selected to provide sufficient degrees of freedom to allow the control variable relationship determination module 130 to fit second-order models during its relationship determination process. In various embodiments, this may facilitate determination of non-linear relationships.

Next, at operation 420, the experimental operation module 120 may determine a blocking strategy for the experimental plan. In various embodiments blocking strategy may include maintaining a particular set of control variable values for a sufficient time as to obtain record performance metric observations for that particular set of control variable values. In various embodiments, blocks may be defined by time and/or by an amount of data that is desired to be recorded various embodiments, blocking may reduce experimental error. In embodiments measuring a computing system 150 that is non-stable (such as one that is constantly increasing in some value), blocking may be used to allow the administrator 110 to discern signal-to-noise strength when presented with relationships, as well as whether particular control variables are important or not.

At operation 430, the experiment operation module 120 may then add control variable value modifications to the experimental plan that respect randomization, repetition, and/or rotatability. In various embodiments, respecting randomization may include planning control variable value modifications in a fashion that avoids systematic patterns. For example, such patterns may include, but are not limited to: day-of-the-week effects; morning/evening patterns; machine warm-up effects; peak vs. off-peak periods, and others. In various embodiments, respecting replication may include planning control variable value modifications that repeat experimental conditions more than once. By repeating conditions, the control variable relationship system may better measure error in the observed performance metrics and account for the error. In various embodiments, respecting rotatability may include planning control variable value modifications that allow models to be fit equally well (such as with the same degree of output variability) in all directions from an center of the experimental design region. Thus, by respecting rotatability, relationships may be determined for a control variable for which, given a distance from the design center, a similar or equal degree of precision may be determined for values that fall substantially close to that distance. After operation 430 is completed, process 400 may then end.

Figure 5:
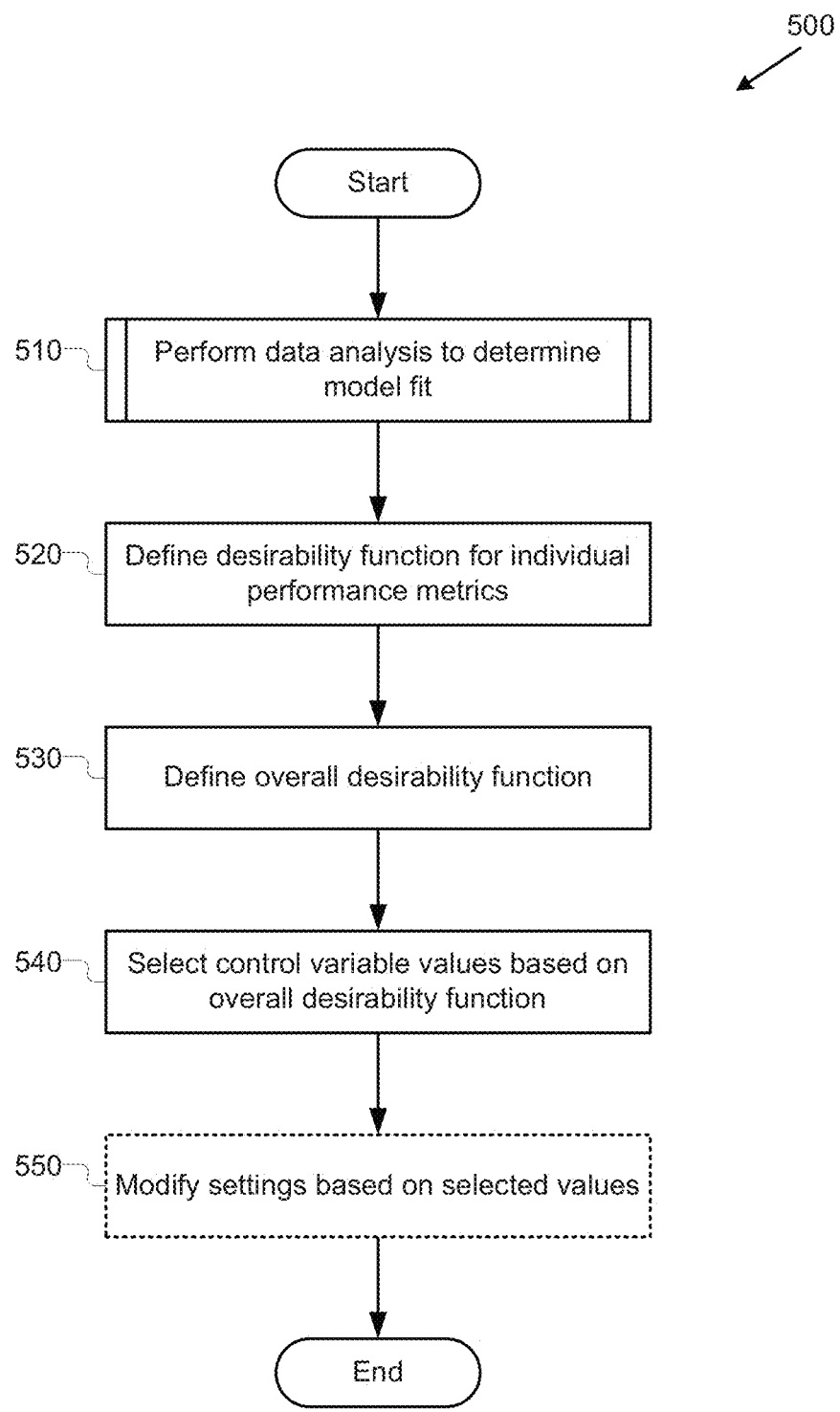
FIG. 5 illustrates a further example control variable relationship determination process, including desirability functions, in accordance with various embodiments.

FIG. 5 illustrates a further example control variable value determination process 500, in accordance with various embodiments. In various embodiments, process 500 may describe one or more implementations of operation 250 of process 200. In various embodiments, the operations of process 500 may be performed by the control variable relationship determination module 130 of the control variable relationship system 100. The process may begin at operation 510, where the control variable relationship determination module 130 may perform a data analysis on the recorded performance metric observations 135 to determine a model that fits the observations. Before the remainder of process 500 is discussed particular examples of implementations of operation 510 will be discussed at this point.

Figure 6:
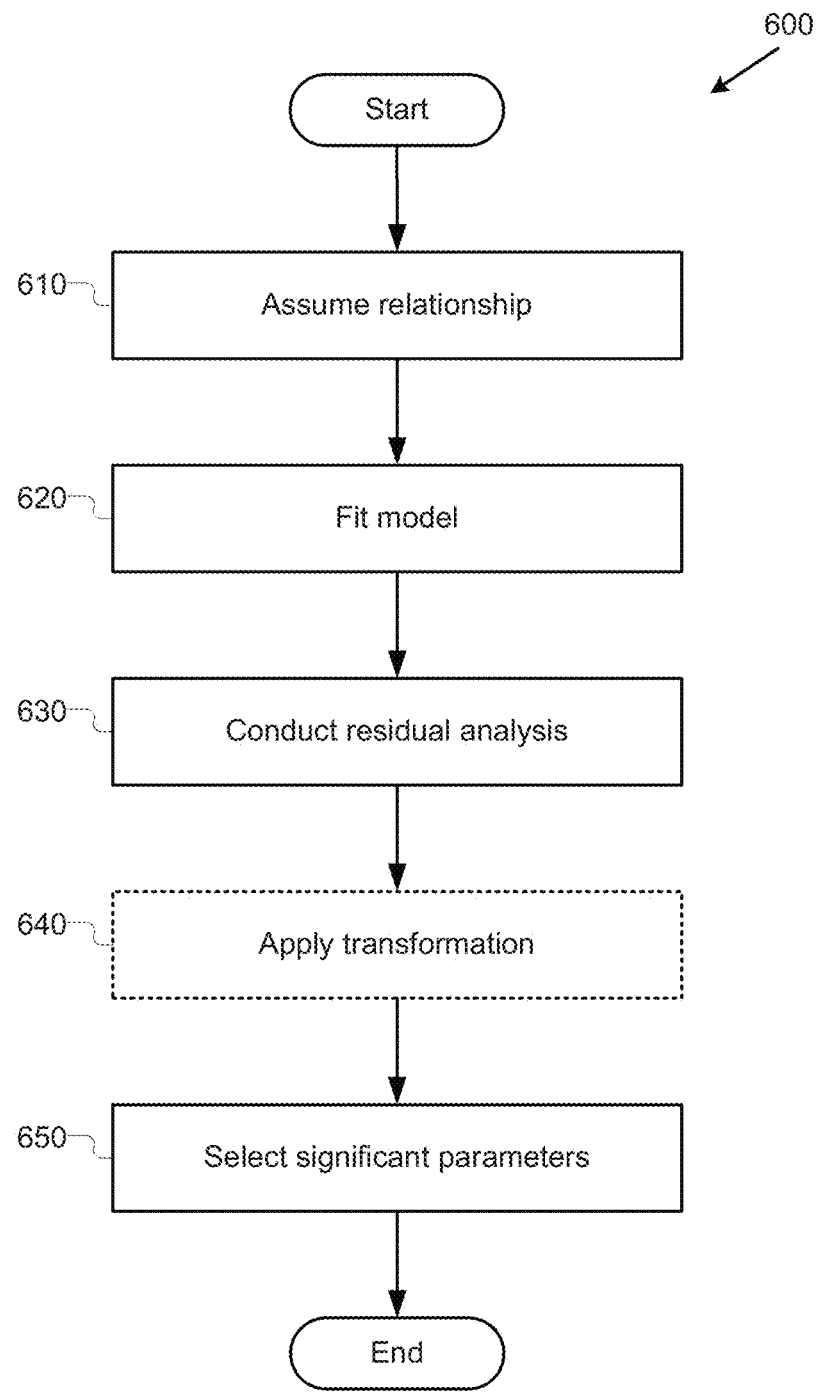
FIG. 6 illustrates an example data analysis process, in accordance with various embodiments.

FIG. 6, which illustrates an example data analysis process 600, in accordance with various embodiments, is now referred to. In various embodiments, process 600 may describe one or more implementations of operation 510 of process 500. In various embodiments, the operations of process 600 may also be performed by the control variable relationship determination module 130 of the control variable relationship system 100. In various embodiments, process 600 may be repeated for each of one or more control variables and/or noise factors. While particular data analysis operations, such as regression modeling, are illustrated as part of process 600, in various embodiments, different data analysis and model-fitting techniques may be used. For example, in various embodiments, decision tree modeling may be used.

The process may begin at operation 610, where the control variable relationship determination module 130 may assume that a type of relationship exists between the control variable and the recorded performance metric observations 135. In some embodiments, a second-order relationship may be assumed; in others a linear relationship may be assumed. In yet other embodiments, other relationships may be assumed. Next, at operation 620, the control variable relationship determination module 130 may fit a model to the recorded performance metric observations 135. In various embodiments, the fit may be performed using known model fitting techniques such as, for example, a least squares estimation, a maximum likelihood estimation, robust regression, and/or others.

Next, at operation 630, the control variable relationship determination module 130 may conduct a residual analysis to review correctness of the fit model. At operation 640, in various embodiments, the model may then be transformed in order to create random residual terms. In some embodiments, this operation may not be performed if not indicated as needed by the residual analysis of operation 630.

Next, at operation 650, the control variable relationship determination module 130 may select significant parameters (such as, for example, control variables and/or noise factors) used in the model. In various embodiments, operation 650 may include removal of non-significant parameters. For example, in some embodiments, parameters may be removed if they have p-values greater than 0.05. In some embodiments, if no parameters are found to have statistical significance, then process 600 may be repeated in so that a better-fitting model may be found. If process 600 is not repeated, then after completion of operation 650, process 600 may then end.

Returning to process 500 illustrated in FIG. 5, process 500 may continue to operation 520, where the control variable relationship determination module 130 may define a desirability function for one or more individual performance metrics. In various embodiments, these desirability functions may be based on one or more of the desirability parameters received by the experimental operation module 120 during process 200. For example, in one embodiment, if a performance metric, is determined to be more desirable as it increases, a desirability function for that performance metric may be based in part on a multiplication of a desirability parameter (e.g, between 0 and 1) for the metric and the nominal value of the performance metric. In another example, if the performance metric is desirable close to a target number, the desirability function may be based, at least in part, on the absolute difference between a current value of the performance metric, and its target number. In various embodiments, other desirability functions may be used.

Next, at operation 530, the control variable relationship determination module 130 may determine an overall desirability function. In various embodiments, the control variable relationship determination module 130 may define the desirability function as follows:

$$d_{overall}(Y) = \exp\left[\frac{\sum_{i=1}^{n} \text{Log}[d_i(Y_i)] \cdot P_i}{\sum_{i=1}^{n} P_i}\right]$$

where the $d_i(Y_i)$ may represent the individual desirability functions for particular performance metric $Y_i$ (where $d_{overall}(Y)$ represents an integer number n of the desirability functions being combined in the example) and the $P_i$ may represent priorities for the performance metrics. While in the example above, the overall desirability function utilizes a type of weighted average of the individual desirability functions, in other embodiments, other overall desirability functions may be determined. In some embodiments, desirability functions may be determined that ensure the curves are continuous and differentiable. In various embodiments, other techniques may be used to compute overall desirability functions.

In various embodiments, at operation 540, the control variable relationship determination module 130 may then select control variable values based on the previously-generated overall desirability function. In various embodiments, this selection may be performed using mathematical optimization of the previously-generated overall desirability function over the previously-provided ranges of values of the control variables. In various embodiments, at operation 550 these selected values may then be used to modify the settings of the computer system 150 that is being tested, in order to provide greater efficiencies in its operation. In other embodiments, the computer system 150 may not be automatically modified but instead, the selected control variable values may be output to the administrator 110 for review and possible implementation during production. After completion of operation 550, process 500 may then end.

Figure 7:
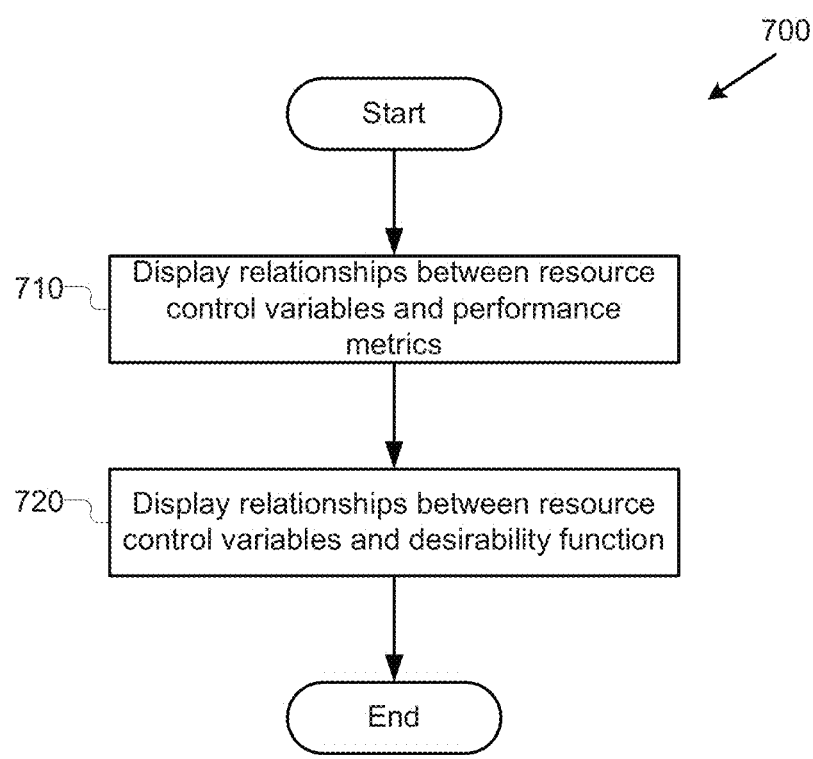
FIG. 7 illustrates an example control variable relationship visualization display process including desirability functions, in accordance with various embodiments.

FIG. 7 illustrates an example control variable relationship visualization display process 700, in accordance with various embodiments. In various embodiments, process 700 may describe one or more implementations of operation 260 of process 200. In various embodiments, the operations of process 700 may be performed by the control variable relationship display module 140 of the control variable relationship system 100. In various embodiments, the control variable relationship display module 140 may generate visualizations for display to a user (such as administrator 110) by an external module or device.

The process may begin at operation 710, where the control variable relationship display module 140 may display relationships determined between one or more control variables and one or more of the performance metrics for which observations were recorded. In various embodiments, these relationships may be based at least in part on the models that were fit to the recorded performance metric observations during process 600.

Figure 8:
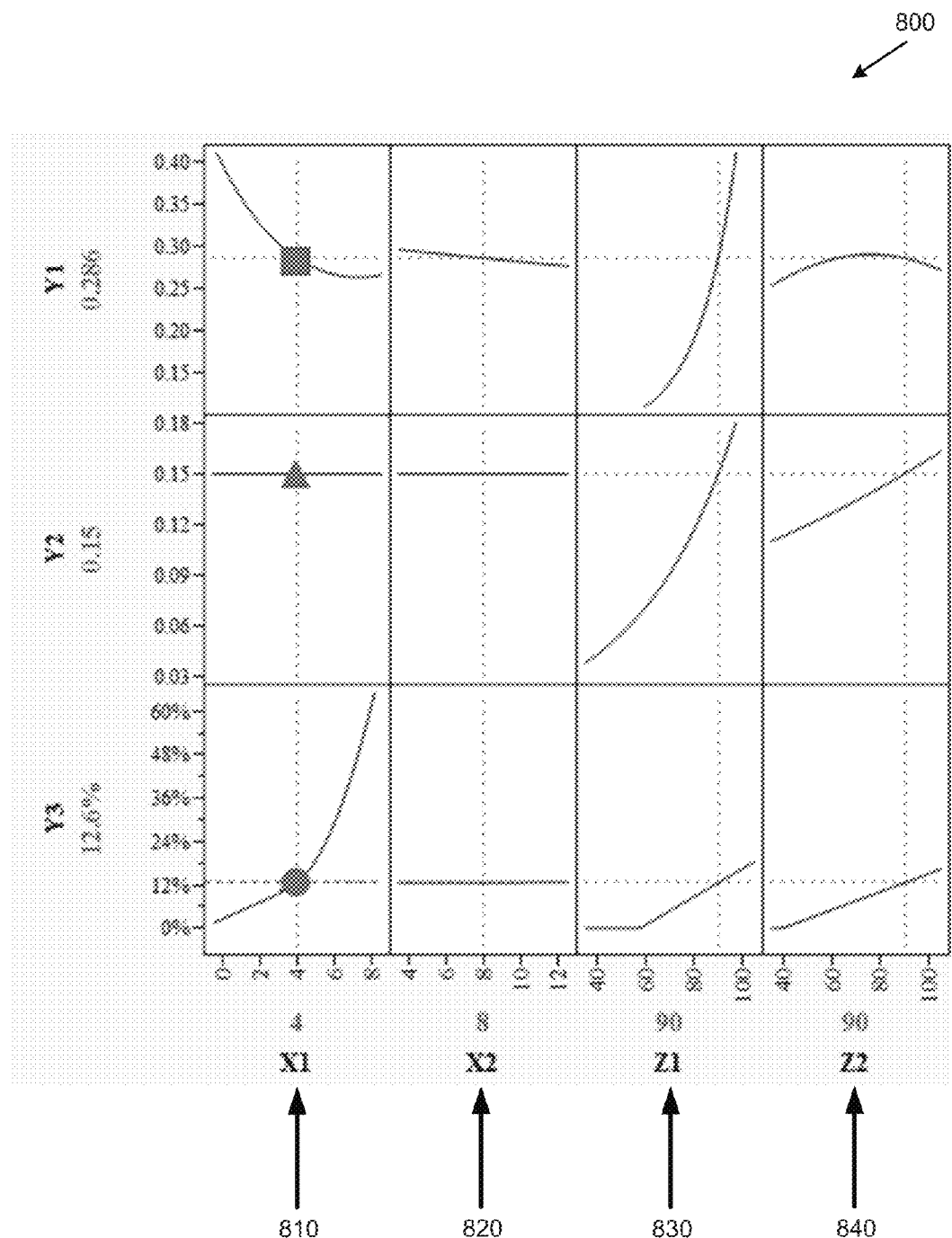
FIG. 8 illustrates an example control variable relationship visualization, in accordance with various embodiments.

FIG. 8 illustrates an example control variable relationship visualization 800, in accordance with various embodiments. In various embodiments, the example visualization 800 may be created through operation 710. FIG. 8 illustrates a column 810, which shows, for a control variable X1, relationships between X1 and three performance metrics: Y1, Y2, and Y3. As column 810 shows, when X1 has a value of 4, Y1, Y2, and Y3 are generally modeled to have values of 12.6%, 0.15, and 0.286, respectively. Further, as changes in X1 appear to have marked affects on at least Y1 and Y3, it is likely that values can be found for X1 that can materially affect the outcomes of the performance metrics Y1 and Y3. In contrast column 820 shows that, for a different control variable X2, very little change is seen in any of the performance metrics Y1, Y2, or Y3. As such, it is unlikely that an administrator 110 will utilize tuning of the X2 control variable to affect outcomes in his or her system. Additionally, in various embodiments, the control variable relationship display module 140 may also display relationships between noise factors and performance metrics, as can be seen in columns 830 and 840.

Figure 9:
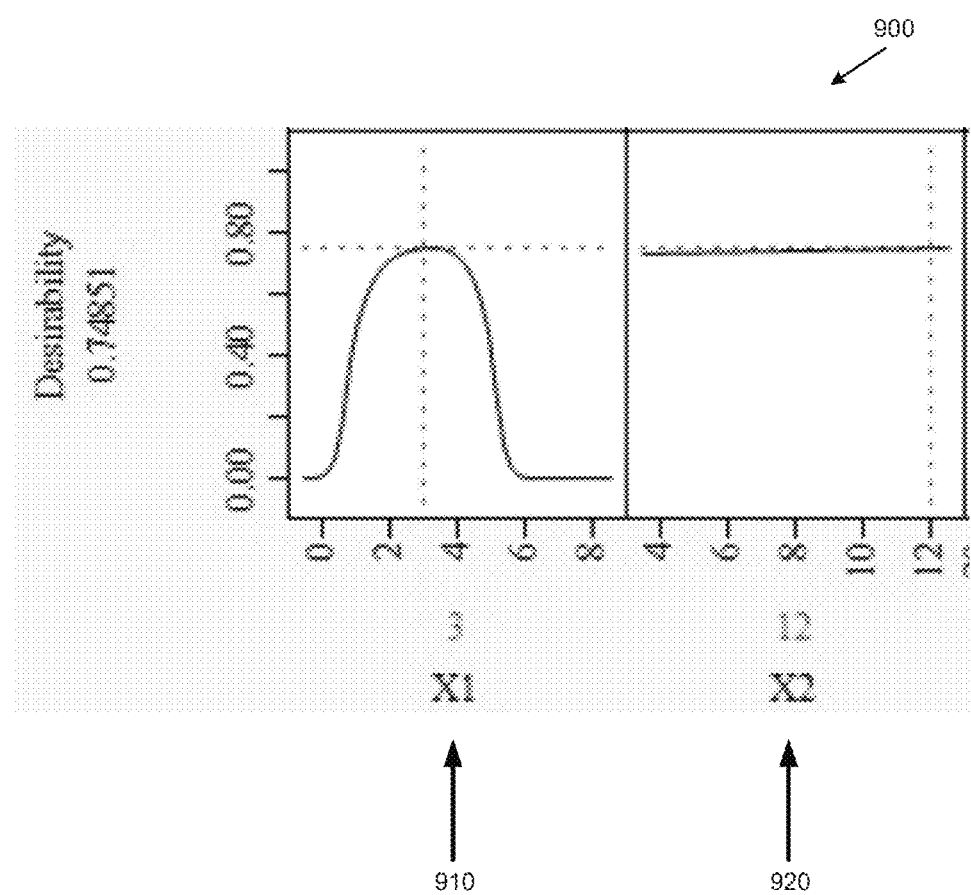
FIG. 9 illustrates another example control variable relationship visualization including desirability functions, in accordance with various embodiments.

Returning to FIG. 7, at operation 720, the control variable relationship display module 140 may display relationships determined between one or more control variables and the overall desirability function, such as during operation 530 of process 500. FIG. 9 illustrates another example control variable relationship visualization 900, in accordance with various embodiments. Example visualization 900 shows, at box 910, a relationship between control variable X1 and the desirability function. As box 910 shows, the relationship shows a desirable value for X1 at around X1=3. As such, in various embodiments, an administrator may desire to set the X1 to 3 on computing system 150 that is being monitored, in order to maximize the desirability function. In some embodiments, the control variable relationship system 100 may perform this setting for the administrator 110. Additionally, box 920 shows that there is very little additional desirability value to be gained through manipulation of the X2 performance metric. As such, an administrator may choose to set X2 as high as possible, or may choose a value of X2 based on entirely different criteria.

Figure 10:
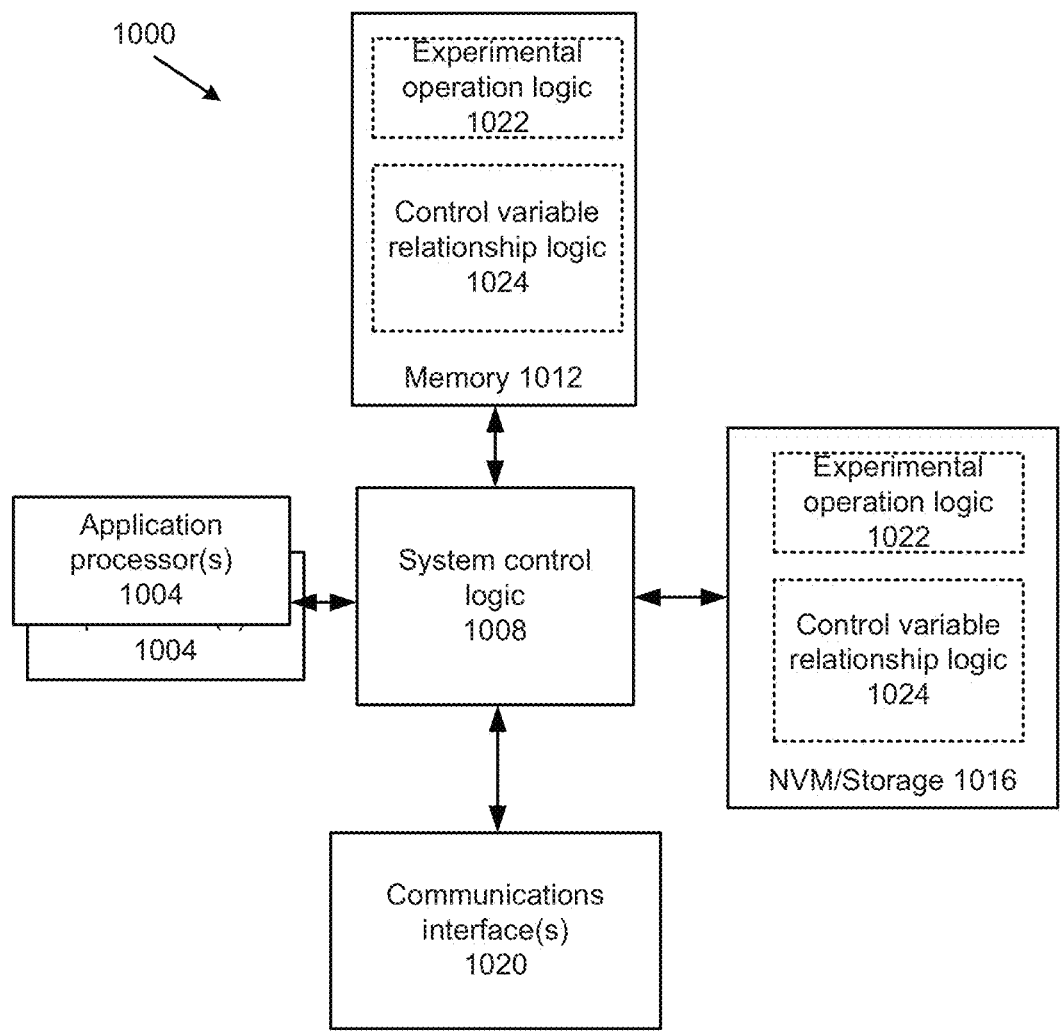
FIG. 10 illustrates an example computing environment, in accordance with various embodiments.

The techniques and apparatuses described herein may be implemented into a system using suitable hardware, firmware, and/or software to configure as desired. FIG. 10 illustrates, for one embodiment, an example system 1000 including at least processors 1004, each having one or more processor cores, system control logic 1008 coupled to at least one of the processors 1004, memory 1012 coupled to system control logic 1008, non-volatile memory ("NVM")/storage 1016 coupled to system control logic 1008, and one or more communications interface(s) 1020 coupled to system control logic 1008. In various embodiments, the system 1000 may include components of a CPU-based software system, a management engine system, or a combination of the two.

System control logic 1008 for one embodiment may include any suitable interface controllers to provide for any suitable interface to at least one of the processors 1004 and/or to any suitable device or component in communication with system control logic 1008. The processors may include a dedicated application processor upon which an application environment may be operated, as well as a separate service processor upon which a manageability engine may be operated. The system may include additional processors or processing cores (not illustrated).

System control logic 1008 for one embodiment may include one or more memory controller(s) to provide an interface to memory 1012. System memory 1012 may be used to load and store data and/or instructions, for example, for system 1000. System memory 1012 for one embodiment may include any suitable non-transitory computer-readable volatile memory, such as suitable dynamic random access memory (DRAM), for example.

System control logic 1008 for one embodiment may include one or more input/output (I/O) controller(s) to provide an interface to NVM/storage 1016 and communications interface(s) 1020.

NVM/storage 1016 may be used to store data and/or instructions, for example. NVM/storage 1016 may include any suitable non-transitory computer-readable non-volatile memory, such as flash memory, for example, and/or may include any suitable non-volatile storage device(s), such as one or more hard disk drive(s) (HDD(s)), one or more solid-state drive(s), one or more compact disc (CD drive(s), and/or one or more digital versatile disc (DVD) drive(s), for example.

The NVM/storage 1016 may include a storage resource physically part of a device on which the system 1000 is installed or it may be accessible by, but not necessarily a part of, the device. For example, the NVM/storage 1016 may be accessed over a network via the communications interface(s) 1020.

Memory 1012 and NVM/storage 1016 may include, in particular, temporal and persistent copies of logic, respectively. In the illustrated example, this logic may include experimental control logic 1022 and/or control variable relationship logic 1024. The experimental control logic 1022 and/or control variable relationship logic 1024 may include instructions that, when executed by at least one of the processors 1004, implement the experiment operation, control variable relationship determination, and/or control variable relationship display modules, and/or result in the system 1000 performing the experimental operation and/or control variable relationship determination and visualization processes described herein earlier. In some embodiments, the experimental control logic 1022 and/or control variable relationship logic 1024 may additionally/alternatively be located in the system control logic 1008.

Communications interface(s) 1020 may provide an interface for system 1000 to communicate over one or more network(s) and/or with any other suitable device. Communications interface(s) 1020 may include any suitable hardware and/or firmware Communications interface(s) 1020 for one embodiment may include, for example, a network adapter, a wireless network adapter, a telephone modem, and/or a wireless modem. For wireless communications, communications interface(s) 1020 for one embodiment may use one or more antenna(s).

For one embodiment, at least one of the processor(s) 1004 may be packaged together with logic for one or more controller(s) of system control logic 1008. For one embodiment, at least one of the processor(s) 1004 may be packaged together with logic for one or more controllers of system control logic 1008 to form a System in Package (SiP). For one embodiment, at least one of the processor(s) 1004 may be integrated on the same die with logic for one or more controller(s) of system control logic 1008. For one embodiment, at least one of the processor(s) 1004 may be integrated on the same die with logic for one or more controller(s) of system control logic 1008 to form a System on Chip (SoC). For at least one embodiment, the SoC may be utilized in a smart phone, cell phone, tablet, or other mobile device.

In various embodiments, system 1000 may have more or less components, and/or different architectures.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application. Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

What is claimed is:

1. One or more non-transitory computer-readable storage media comprising instructions that, in response to execution by a computer device, cause the computer device, for managing performance of a computer system, to:

receive one or more parameters describing the computer system executing one or more processes, the computer system controlled by a set of control variables;

generate an experimental plan, wherein the experimental plan directs modification of one or more values of one or more of the control variables during execution of the one or more processes;

record observations of a plurality of performance metrics for the computer system executing the one or more processes with the one or more values of the one or more of the control variables being modified according to the experimental plan;

based on the recorded observations of the performance metrics under various control variable values, determine corresponding values for a desirability metric for the performance metrics for the various control variable values, wherein differences between the different values of the desirability metric of the performance metrics denote differences in desirability of performance of the computer system as denoted by the performance metrics for the various control variable values;

compute values for an overall desirability metric based on the corresponding values of the desirability metric of the performance metrics for different combinations of the various control variable values, and priority values of the performance metrics, wherein differences between the values of the overall desirability metric denote difference in desirability of performance of the computer system as denoted by the performance metrics for different combinations of the control variable values; and select a value for each of the one or more of the control variables to execute the one or more processes, based on the values of the overall desirability metric.

2. The non-transitory computer-readable media of claim 1, wherein the instructions further cause the computer device to select the value for each of the one or more of the control variables based on the determined corresponding values of the desirability metric of the performance metrics.

3. The non-transitory computer-readable media of claim 1, wherein receive one or more parameters comprises receive parameters describing the control variables and the performance metrics.

4. The non-transitory computer-readable media of claim 1, wherein the experimental plan further specifies observation of one or more noise factors, which are uncontrolled variable or variables, and wherein receive one or more parameters comprises receive one or more parameters describing the one or more noise factors, and record observations further comprises recording the one or more noise factors.

5. The non-transitory computer-readable media of claim 1, wherein generate an experimental plan comprises generate one or more randomized modifications to the one or more values of the one or more of the control variables.

6. The non-transitory computer-readable media of claim 1, wherein generate an experimental plan comprises generate one or more modifications to the one or more values of the one or more of the control variables that are performed in blocks.

7. An apparatus comprising:
one or more computer processors;
an experimental operation module to be operated by the one or more computer processors, to manage performance of a computer system to be used to execute one or more processes, to:

receive a plurality of parameters describing a set of control variables of the computer system;

generate an experimental plan directing modification of one or more values of one or more of the control variables during execution of the one or more processes; and record observations of a plurality of performance metrics for the computer system executing the one or more processes while the one or more values of the one or more of the control variables are being modified according to the experimental plan; and a control variable relationship module to be operated on the one or more processors to, based on the recorded observations of the performance metrics under various control variable values, determine corresponding values of a desirability metric for the performance metrics for the various control variable values, wherein differences between the different values of the desirability metric of the performance metrics denote differences in desirability of performance of the computer system as denoted by the performance metrics for the various control variable values; compute values for an overall desirability metric based on the corresponding values of the desirability metric of the performance metrics for different combinations of the various control variable values, and priority values of the performance metrics, wherein differences between the values of the overall desirability metric denote difference in desirability of performance of the computer system as denoted by the performance metrics for different combination of the control variable values; and select a value for each of the one or more of the control variables to execute the one or more processes, based on the values of the overall desirability metric.

8. The apparatus of claim 7, wherein the experimental operation module is to receive a plurality of parameters that describe the control variables or the performance metrics.

9. The apparatus of claim 7, wherein the experimental operation module is to generate an experimental plan that includes randomized modifications to the values of the one or more of the control variables.

10. The apparatus of claim 7, wherein the experimental operation module is to generate an experimental plan that includes blocked modifications to the values of the one or more of the control variables.

11. The apparatus of claim 7, wherein the control variable relationship module is further to select one or more values for the one or more of the control variables based on the determined corresponding values of the desirability metric for the performance metrics.

12. A computer-implemented method for managing performance of a computer system comprising:

receiving, by a computer device, a plurality of parameters describing a set of control variables of a computer system to be used to execute one or more processes;

generating, by the computer device, an experimental plan directing modification of one or more values of one or more of the control variables during execution of the one or more processes;

recording, by the computer device, observations of a plurality of performance metrics for the computer system executing the one or more processes while modifying, by the computer device, the one or more values of the one or more of the control variables according to the experimental plan;

based on the recorded observations of the performance metrics under various control variable values, determining, by the computer device, corresponding values of a desirability metric of the performance metrics for the various control variable values, wherein differences between the different values of the desirability metric of the performance metrics denote differences in desirability of performance of the computer system as denoted by the performance metrics for the various control variable values;

computing values for an overall desirability metric based on the corresponding values of the desirability metric of the performance metrics for different combinations of the various control variable values, and priority values of the performance metrics, wherein differences between the values of the overall desirability metric denote difference in desirability of performance of the computer system as denoted by the performance metrics for different combinations of the control variable values; and selecting a value for each of the one or more of the control variables to execute the one or more processes, based on the values of the overall desirability metric.

13. The method of claim 12, further comprising selecting, by the computer device, a value for each of the one or more of the control variables based on the determined corresponding values of the desirability metric for the performance metrics.

14. The method of claim 12, wherein receiving a plurality of parameters comprises receiving parameters describing the control variable or the performance metrics.

15. The method of claim 12, wherein receiving a plurality of parameters further comprises receiving parameters describing one or more noise factors, which are uncontrolled variables of the computer system, wherein the experimental plan further specifies observation of the one or more noise factors, and recording further comprises recording observations of the one or more noise factors while the computer system executing the one or more processes with the one or more values of the one or more of the control variables being modified according to the experimental plan.

16. The method of claim 12, wherein generating an experimental plan comprises generating randomized modifications to the one or more values of the one or more of the control variables.

17. The method of claim 12, wherein generating an experimental plan comprises generating modifications to the one or more values of the one or more of the control variables that are performed in blocks.

18. The non-transitory computer readable media of claim 1, wherein to compute an overall desirability metric, the computer device is caused to compute:

$$d_{overall}(Y) = \exp\left[\frac{\sum_{i=1}^{n} \text{Log}[d_i(Y_i)] \cdot P_i}{\sum_{i=1}^{n} P_i}\right]$$

where the $d_i(Y_i)$ and $P_i$ are the corresponding value of the desirability metric and its priority of performance metric $Y_i$, and $d_{overall}(Y)$ is the overall desirability metric.

19. The apparatus of claim 7, wherein to compute an overall desirability metric, the control variable relationship module is to compute:

$$d_{overall}(Y) = \exp\left[\frac{\sum_{i=1}^{n} \text{Log}[d_i(Y_i)] \cdot P_i}{\sum_{i=1}^{n} P_i}\right]$$

where the $d_i(Y_i)$ and $P_i$ are the corresponding value of the desirability metric and its priority of performance metric $Y_i$, and $d_{overall}(Y)$ is the overall desirability metric.

20. The method of claim 12, wherein computing an overall desirability metric comprises computing:

$$d_{overall}(Y) = \exp\left[\frac{\sum_{i=1}^{n} \text{Log}[d_i(Y_i)] \bullet P_i}{\sum_{i=1}^{n} P_i}\right]$$

where the $d_i(Y_i)$ and $P_i$ are the corresponding value of the desirability metric and its priority of performance metric $Y_i$, and $d_{overall}(Y)$ is the overall desirability metric.

\* \* \* \* \*